July 5, 1927.

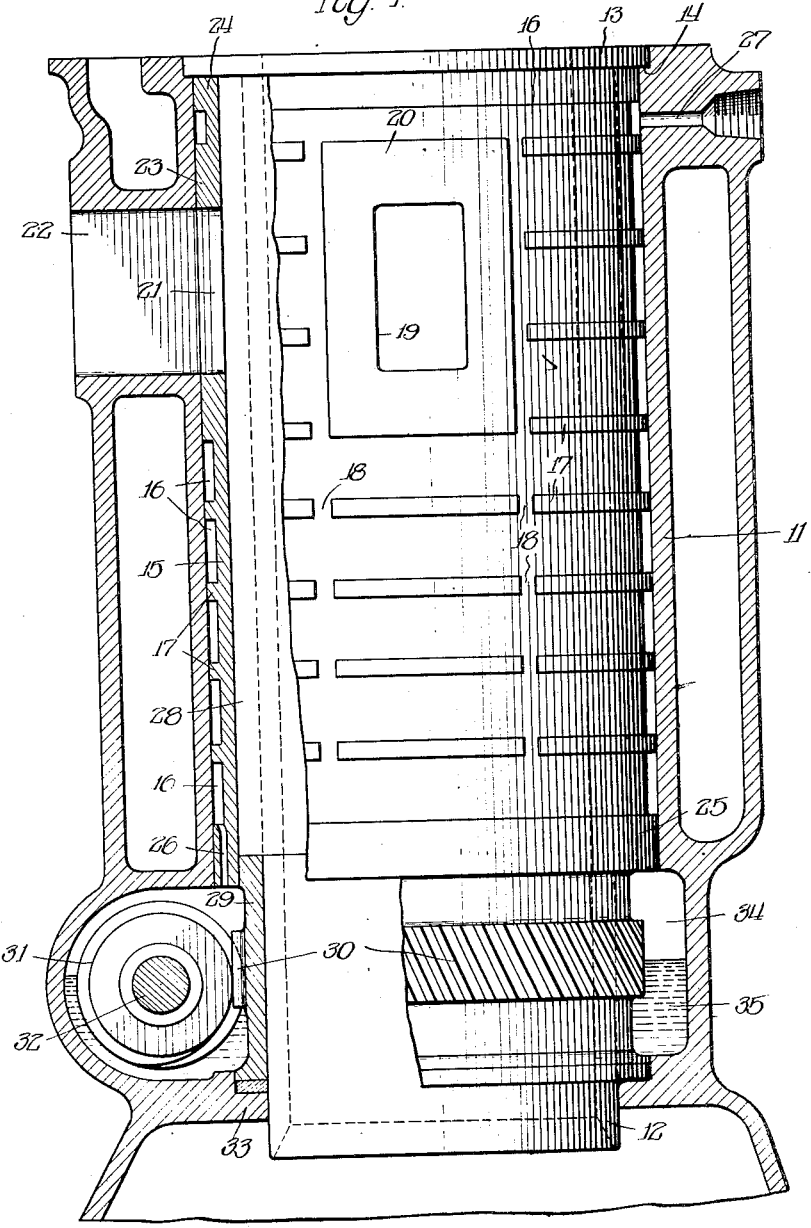

C. E. BONNER 1,634,768

ENGINE LUBRICATION

Filed May 15, 1925

Witness:
R. Burkhardt

Inventor:
Clarence E. Bonner,
By Wilkinson Huxley Byron & Knight
Attys

Patented July 5, 1927.

1,634,768

UNITED STATES PATENT OFFICE.

CLARENCE E. BONNER, OF NEW YORK, N. Y., ASSIGNOR TO BONNER-CHARTER CORPORATION, OF DOVER, DELAWARE, A CORPORATION OF DELAWARE.

ENGINE LUBRICATION.

Application filed May 15, 1925. Serial No. 30,417.

This invention relates to a new and improved method and means for lubricating engines and relates more particularly, to a means and method for lubricating internal combustion engines of the sleeve valve type.

In engines of this type the sleeve which comprises the valve is rotated or reciprocated and its efficient lubrication is essential since it has a relatively large area in intimate contact with other engine parts. The contact between the sleeve and the associated engine parts is rendered more intimate in most forms of such construction by the force of the explosion in the cylinder. This intimate contact and the high temperatures maintained during the engine operation renders the continual lubrication necessary. It has been found extremely difficult to lubricate engines of this type as feeding too much oil will cause the oil to work into the cylinder, while feeding too little oil will cause the rotating parts to heat and wear.

The lubricating method and means of the present invention insures adequate lubrication without possibility of feeding too much oil between the wearing surfaces. The method of lubrication is adapted for many other purposes, as well as the lubrication of sleeve valve motors and can be used in motors of the poppet valve type both for cylinder and valve lubrication and also for bearing lubrication.

It is an object of the present invention to provide a new and improved means and method adapted for lubricating engine parts.

It is a further object to provide a new and improved means and method for lubricating which is particularly adapted for use in sleeve valve motors.

It is also an object to provide a method and means of the character described adapted to insure adequate lubrication without danger of over-lubrication.

Other and further objects will appear as the description proceeds.

I have shown in the accompanying drawings one preferred form of my invention.

In the drawings—

Figure 1 is a fragmentary view partly broken away of a sleeve valve cylinder construction embodying the invention;

Figure 3:
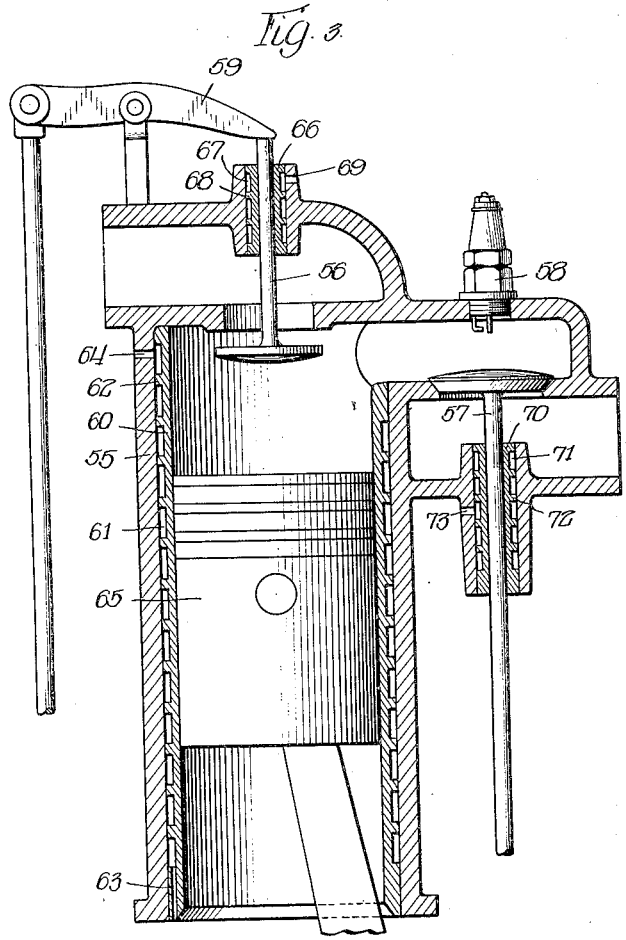
Figure 3 is a view similar to Figure 1 showing a pocket valve construction.

Referring to Figure 1, the construction comprises a cylinder block 11 into which is fitted the cylinder 12, the cylinder being provided at its upper end with a flange 13 fitting into a recess 14 at the top of the cylinder block. The liner 15 has a forced fit in the cylinder block and is located between the cylinder block and cylinder. This liner 15 has its outer surface formed into grooves 16 and lands 17, the lands 17 being interrupted at circumferentially spaced points as indicated at 18. The liner 15 is provided with ports corresponding to the ports in the cylinder block 11. The liner port 19 is surrounded by the raised portion 20 which is on the level with the lands and closely engages the adjacent wall of the cylinder block. The liner port 21 is in registration with the cylinder block port 22 and is surrounded by the raised portion 23. The upper end of the liner is provided with a circumferentially continuous land 24 and the lower end of the sleeve is provided with the wide circumferentially unbroken land 25. Through the lower end of the liner extends the bore 26 communicating with the lowermost groove 16.

The passage 27 extends through the upper end of the cylinder block and communicates with the uppermost groove of the liner. The sleeve valve 28 is fitted between the liner 15 and the cylinder 12 and is in intimate contact with both of these members. The sleeve valve drive member 29 is located below the sleeve valve and encircles the cylinder. It is provided with gear teeth 30 which mesh with the worm 31 carried by shaft 32. The cylinder block is provided with an inwardly extending flange 33 which fits closely against the lower end of the cylinder. This flange closes the lower side of the oil chamber 34 so that the gears run in a bath of oil 35 supplied through the small passage 26 in the liner. It will be understood that if desired additional oil may be supplied to the chamber 34 in any preferred manner. The function of the small passage 26 is to form a bleeder to permit the circulation of oil through the liner grooves.

It is understood that in the operation of this form of engine, the sleeve 28 is continuously rotated by means of the drive member 29, which latter is driven by shaft 32. The explosions in the cylinder continually urge the cylinder wall outwardly into contact with the sleeve valve and the sleeve valve into contact with the liner. Oil is forced through passage 27 into the groove 16 in the liner and this oil fills all of the groove 16. The oil is restrained from flowing out through the ports by the raised portions or lands 20 and 23 surrounding the ports. The oil flows downwardly through the cuts 18 in the lands and finally flows down through the passage 26 to the oil chamber 34. The liner 15 is formed of porous matter and preferably of cast iron.

Figure 2:
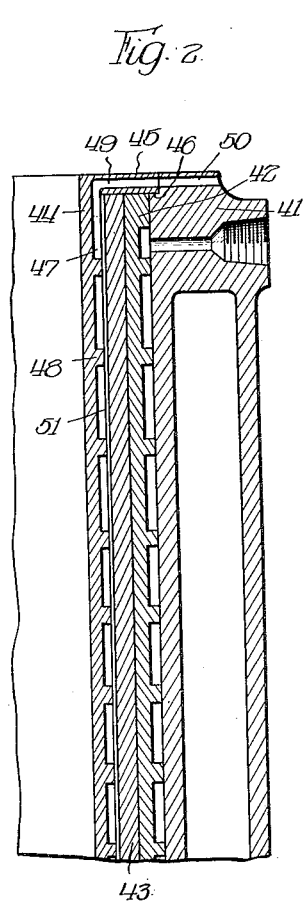
Figure 2 is a fragmentary view showing a modified sleeve valve construction.

The form of construction shown in Figure 2 comprises a cylinder block 41 having a liner 42 fitted therein in a manner similar to the liner 15 of Figure 1. The sleeve valve 43 operates inside of the liner 42. The inner cylinder member 44 fits within the cylinder block 41, the sleeve valve and liner 42 being between the cylinder block and inner cylinder. The flange 45 upon the upper edge of the inner cylinder member 44 rests in the recess 46 in the cylinder block, thus properly positioning the parts. The inner cylinder member 44 is provided with the grooves 47 and lands 48 in a manner similar to those shown in Figure 1. It will be understood that the lands 48 are interrupted at circumferentially spaced points, so as to permit vertical movement of the oil. The passage 49 through the flange 45 communicates with a passage 50 in the cylinder block through which oil is fed to the grooves. The sleeve 51 is fitted upon the lands on the inner cylinder member in such manner, as for example, shrinking it on so that the parts are permanently secured together with an oil-tight fit.

In this form of construction the oil passing through the porous liner 42 lubricates the interfitting surfaces of the liner and rotating sleeve valve 43. The oil from the grooves in the inner cylinder block passes through the porous sleeve 51 to lubricate the adjacent surface of the sleeve valve. The oil also works through the porous cylinder member 44 to lubricate the inner surface of the cylinder and the interfitting piston.

Referring now to the form of construction shown somewhat diagrammatically in Figure 3, the engine comprises the cylinder block 55 carrying the exhaust valve 56, the intake valve 57 and spark plug 58. The exhaust valve 56 is shown as operated by the rocker 59. The cylinder block 55 has the liner 60 closely fitted therein. This liner 60 is provided with the groove 61 and lands 62, these being similar in construction to those shown in Figure 1. The bleeder passage 63 extends through the lower portion of the liner. The oil may be introduced into the grooves in the liner through the opening 64. The piston 65 operates in the cylinder making the usual tight fit against the liner 60.

The stem of the exhaust valve 56 is surrounded by a liner 66 provided with the grooves 67 and lands 68. Oil may be introduced into the grooves through the opening 69. The stem of the intake valve 57 passes through the liner 70 provided with the grooves 71 and lands 72. Oil may be fed to the grooves through the opening 73.

Figure 4:
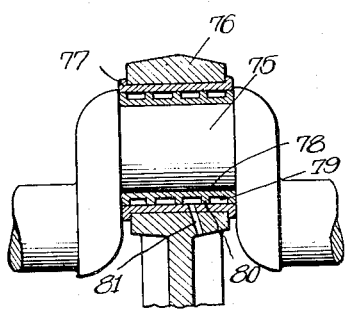
Figure 4 is a fragmentary section showing a bearing construction.

Referring next to Figure 4, the crank shaft 75 is carried in the bearing 76. The bearing carries the sleeve 77 into which is fitted the liner 78 provided with grooves 79 and lands 80. Oil is introduced into the grooves through the passage 81. It will be understood that the sleeve 77 and liner 78 will be made in two parts in order to permit them to be put in place. It has been found that certain types of gray iron are sufficiently porous to permit the passage of oil in quantities such as to efficiently lubricate the contacting surfaces of the liner and sleeve valve. It is possible, however, to construct the liner of other porous material, such for example, as unglazed ceramic material.

My improved lubricating means and method has been shown as applied to different types of motors and to different bearing parts of such motors. It is capable of use for a wide variety of bearing purposes and the use of a porous bearing of this type has proven in practice to be very efficient in providing adequate lubrication without danger of over oiling.

I contemplate such changes and modifications as come within the spirit and scope of the accompanying claims.

I claim:

1. Machine construction comprising a fixed member, a liner fitted in said member, a movable member inside said liner, said liner being formed of porous material, and means for supplying lubricant to the external surface of said liner.

2. Machine construction comprising a fixed member, a liner fitted in said member, a movable member inside said liner, said liner being formed of porous material, channels between the liner and fixed member and means for supplying lubricant to said channels.

3. Cylinder construction comprising a cylinder block, a porous cast iron liner fitted in said block, a movable member inside the liner, and means for supplying lubricant to the external surface of the liner, the lubricant working through the porous liner to lubricate its inner surface.

4. In a sleeve valve motor, a cylinder block, a porous liner fitted into the cylinder block, a sleeve valve inside the liner and movable relative thereto, and means for supplying lubricant to the external surface of the liner, the lubricant working through the porous liner and lubricating the interfitting inner surface of the liner and the outer surface of the sleeve valve.

5. In a sleeve valve motor, a cylinder block, a porous liner fitted into the cylinder block, a sleeve valve inside the liner and movable relative thereto, lubricant carrying channels formed between the liner and cylinder block, and means for supplying lubricant to said channels, the lubricant working through the porous liner and lubricating the interfitting inner surface of the liner and the outer surface of the sleeve valve.

6. In a sleeve valve motor, a cylinder block, a porous cast iron liner pressed into the cylinder block, a sleeve valve inside the liner and movable relative thereto, lubricant carrying channels formed in the outer surface of the liner, and means for supplying lubricant to said channels, the lubricant working through the liner and lubricating the interfitting liner and sleeve valve surfaces.

7. In a sleeve valve motor, a cylinder block, an inner cylinder fitted in said block, a sleeve valve fitted between the cylinder block and inner cylinder, oil channels formed in the inner cylinder, and means for supplying oil to the channels, the inner cylinder being formed of porous material whereby the oil works through the member to lubricate the inner surface thereof.

8. In a sleeve valve motor, a cylinder block, an inner cylinder fitted in said block, a sleeve valve fitted between the cylinder block and inner cylinder, oil channels formed in the outer surface of the inner cylinder, a sleeve fixedly secured to the inner cylinder to close the outer face of said channels, and means to supply oil to the channels, the inner cylinder and sleeve being formed of porous material whereby the oil works through the two members to lubricate the inner surface of the inner cylinder, and the surface between the sleeve and sleeve valve.

9. Machine construction comprising two relatively movable members, a liner fitted to one of said members and engaging the other member, said liner being formed of porous material, and means for supplying lubricant to said liner.

10. In an engine two relatively movable members contacting on a common surface to be lubricated, one member being of porous material through which oil can pass, a source of oil, and means tending to move oil through the porous material to the surface to be lubricated.

11. In an engine, two relatively movable members contacting on a common surface to be lubricated, one member being of porous material through which oil can pass and provided with a recess of substantially the dimensions of the porous material member through which oil can reach all parts of the porous material, a source of oil, and means tending to move oil through said recess and the porous material to the surface to be lubricated.

12. In an engine, a movable member contacting surfaces of two other members to be lubricated, the material of one of the members adjacent to one of said surfaces being porous and means delivering oil through said porous material to the surface to be lubricated.

13. In an engine, in combination with a stationary member and a member moving over said stationary member, a piece of porous material carried by one of said members engaged by the other, and means delivering oil through the porous piece to the member engaging it.

14. In an engine, in combination with a stationary member and a member moving over said stationary member, a piece of porous material carried by the stationary member, engaged by the rotatable member, and means delivering oil through the porous piece to the member engaging it.

CLARENCE E. BONNER.